United States Patent [19]
Candlin et al.

[11] 3,934,436
[45] Jan. 27, 1976

[54] STANDARD FOR PARKING AND LOCKING A BICYCLE

[76] Inventors: Francis T. Candlin, 280 Madison St.; Michael D. Candlin, 2737 E. 13th Ave., both of Denver, Colo. 80206

[22] Filed: Mar. 29, 1974

[21] Appl. No.: 456,359

[52] U.S. Cl. .................................. 70/234; 211/5
[51] Int. Cl.² ..................... B62H 5/00; E05B 73/00
[58] Field of Search .................. 70/234, 58; 211/5; 224/42.03 B; 119/124, 125, 122; 248/203, 295

[56] References Cited
UNITED STATES PATENTS

| | | | |
|---|---|---|---|
| 77,686 | 5/1968 | Walther | 119/124 |
| 606,118 | 6/1898 | Bowman | 211/5 |
| 1,064,200 | 6/1913 | Engblom | 119/124 |
| 1,527,082 | 2/1925 | Sampson | 248/203 |
| 2,655,191 | 10/1953 | Partin | 248/295 |
| 2,673,771 | 3/1954 | Krewson | 248/295 |
| 2,725,853 | 12/1955 | Nordheim | 119/124 |
| 3,739,609 | 6/1973 | Kaufmann | 70/234 |
| 3,762,569 | 10/1973 | Spring | 211/5 |
| 3,827,773 | 8/1974 | Aiello | 70/234 |

*Primary Examiner*—Paul R. Gilliam
*Assistant Examiner*—Alex Grosz
*Attorney, Agent, or Firm*—John E. Reilly; Earl C. Hancock

[57] ABSTRACT

A standard for parking and locking a bicycle including an upright post, a clamp depending from the post to grip the frame of a bicycle and hold it alongside the post and a wire rope retractably carried within the post to be extended therefrom to lash the wheels and frame of the bicycle together. The clamp and cable may be locked together by a padlock to prevent the bicycle from being stolen.

10 Claims, 6 Drawing Figures

U.S. Patent  Jan. 27, 1976  3,934,436
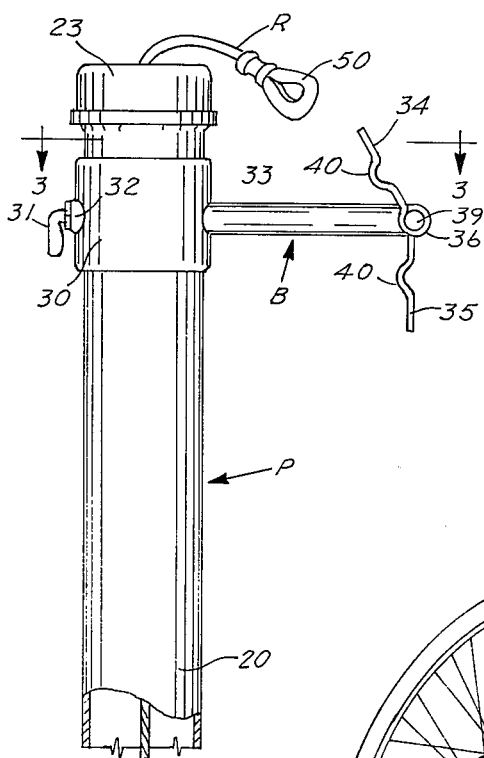
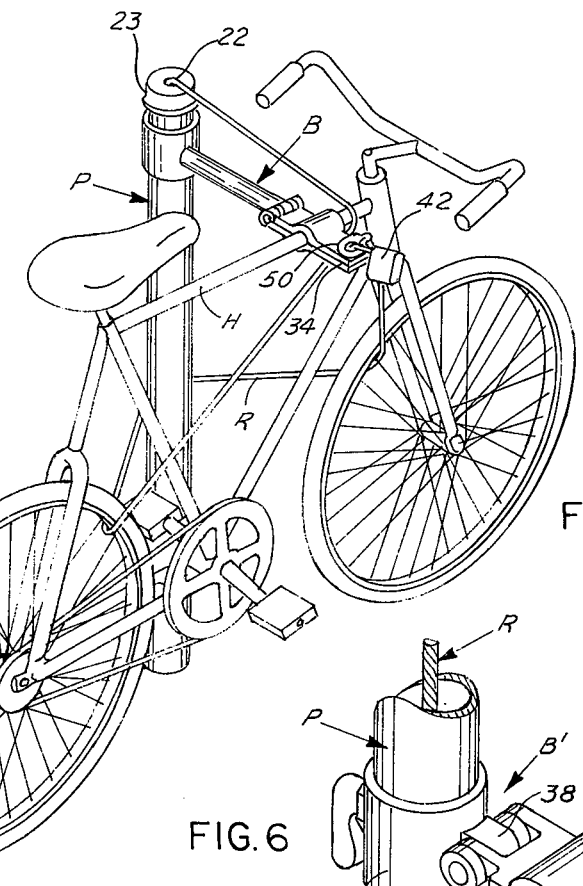
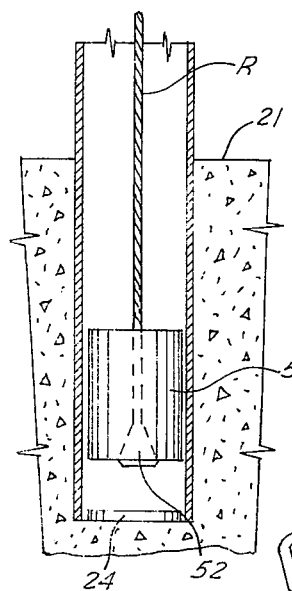
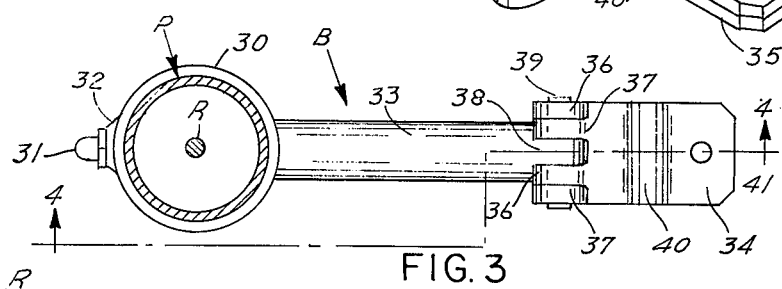
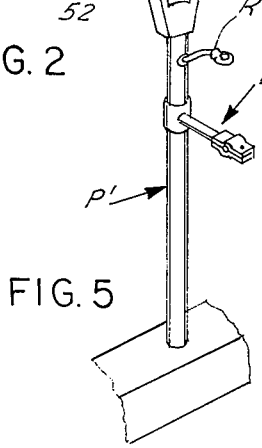
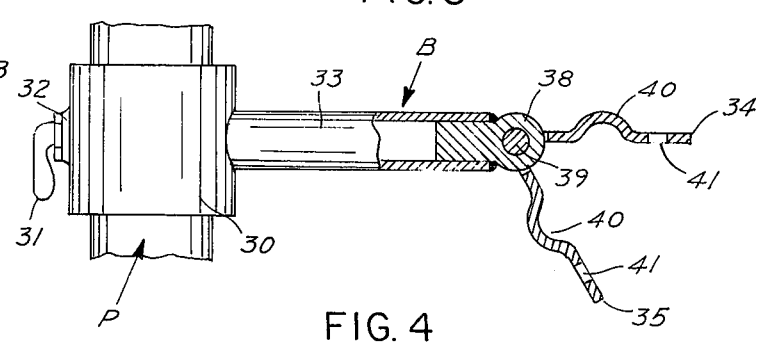
FIG. 1
FIG. 2
FIG. 3
FIG. 4
FIG. 5
FIG. 6

STANDARD FOR PARKING AND LOCKING A BICYCLE

The present invention relates to apparatus for parking bicycles and more particularly to a bicycle parking standard of the type which permits a bicycle owner to secure his bicycle in an upright position and also to lock it in place. As such, the invention will be hereinafter called a "Standard for Parking and Locking a Bicycle."

The use of bicycles is constantly increasing throughout the country due to fuel shortages and other factors. As more bicycles are used, more bicycles are stolen and the problems relating to the prevention of bicycle theft are becoming more serious and vexing. The problem is aggravated because many popular types of bicycles, being sold today, include quick change wheel mounts which permit the wheels to be quickly and easily removed from a bicycle. Many conventional types of bicycle parking racks are provided with inadequate locking devices. If a lock secures the frame of the bicycle to a rack, the wheels may be stolen, or if the front wheel is locked to the rack, the body of the bicycle may be stolen. This has led to the use of chains and wire ropes which can be lashed about the bicycle to secure the wheels along with the frame. However, such chains or wire ropes are not ordinarily affixed to a rack and are usually carried by the cyclist. These are inconvenient expedients; nevertheless, chains or wire ropes, which are awkward and inconvenient for use as an accessory, are carried by the rider and attached to conventional bicycle stands.

The present invention was conceived and developed with such and other considerations in view and the invention comprises, in essence, an upright standard, preferably a tubular post, having a clamp to grip the bicycle frame and hold the bicycle in an upright position alongside the post. A wire rope within the post is extended therefrom to be interwoven about the bicycle, threaded through the wheels thereof, and extended to the clamp. The clamp and wire rope are locked together by a padlock to secure the same to the standard.

It follows that an object of the invention is to provide a novel and improved standard for parking and locking a bicycle which utilizes a rigid clamp to hold a frame member of the bicycle, a flexible wire rope to lash the wheels and body of the bicycle together and a lock to secure the clamp and rope, all to render theft of the bicycle extremely difficult.

Another object of the invention is to provide a novel and improved standard for parking and locking a bicycle, including a hollow post and a wire rope for lashing the frame and wheels of the bicycle together, all in an arrangement which neatly and conveniently retains the rope within the post until needed.

Another object of the invention is to provide a novel and improved standard for parking and locking a bicycle which includes a vertically movable clamp carried upon a post to grip and hold the bicycle frame in a fixed, upright position, alongside the post, and prevent the bicycle from falling sidewise onto the ground.

Another object of the invention is to provide in a standard for parking and locking a bicycle, including a clamp for gripping the frame of the bicycle and holding it in place, an arrangement which may be quickly and easily adjusted to accommodate various size bicycles.

Another object of the invention is to provide a novel and improved standard for parking and locking a bicycle which may be used for parking bicycles only, or which may be incorporated into a conventional parking meter for automobiles, or a parking meter for the bicycle.

Other objects of the invention are to provide a standard for parking and locking a bicycle, which is a simple, compact, neatappearing, low-cost, rugged and durable structure.

With the foregoing and other objects in view, the present invention comprises certain constructions, combinations and arrangements of parts and elements as hereinafter described, defined in the appended claims and illustrated in preferred embodiment by the accompanying drawings in which:

FIG. 1 is a perspective view of a preferred embodiment of the improved bicycle parking standard with a bicycle being parked and locked therein;

FIG. 2 is a side elevational view of the standard shown at FIG. 1, including a bottom section embedded into concrete or the like, with portions of the standard being shown in section and with other portions broken away to conserve space;

FIG. 3 is a sectional plan view as taken substantially from the indicated line 3-3 at FIG. 2;

FIG. 4 is a side elevational view partly in section as taken from the indicated line 4-4 at FIG. 3;

FIG. 5 is a small scale perspective view of the standard incorporating a conventional parking meter; and FIG. 6 is a fragmentary perspective view of a portion of the standard to illustrate a modified construction.

Referring more particularly to the drawings, the improved standard for holding and securing a bicycle combines a hollow post P, a body clamp B reciprocably carried upon this post, and a wire rope R which is normally within the post. The post P is a moderately heavy pipe 20 preferably three to four inches in diameter, and it is contemplated that a standard conventional pipe or tubing may be used for this purpose and, as hereinafter exemplified, this post may be the standard for a conventional parking meter. In the arrangement shown at FIGS. 1 and 2, the pipe 20 is mounted in the pavement or ground 21, preferably in a concrete base to upstand therefrom to a height of approximately four feet, somewhat higher than the largest types of bicycles, so that it may be used for all sizes of bicycles.

The passageway within this tubular post is used to retain portions of wire rope R, which is pulled from an orifice 22 in a cap 23 at the top of the post. It follows that the length of the post must be at least sufficient to provide for a suitable length of wire rope to permit the wire rope to be extended from the post and wrapped about a bicycle. If necessary, when the post is set in concrete or in the ground, the bottom of the post may be closed with a plug 24 to prevent concrete or dirt from filling this lower end of the post.

The body clamp B is mounted upon a collar 30 which slidably embraces this post so that the clamp may be shifted along the post to selected heights to accommodate bicycles of varying sizes. Ordinarily, this body clamp B will be secured to the upper, horizontal bar H of a bicycle, as illustrated at FIG. 1, and this horizontal bar H may vary in height from 24 – 42 inches in different types of bicycles. To secure the clamp at any position along the reach of the pipe, a lock screw 31 may be provided in a threaded boss 32 at the back side of this collar 30 to bear against the pipe 20 when it is tightened.

The clamp B includes a strut 33 outstanding horizontally from the collar 30 to carry a pair of pivoted, opposing, flat, strap-like arms 34 and 35 to form a clasp or frame clamp. Interfingered hinge eyes 36 and 37 are formed at the base of the clasp arms and these eyes embrace a pin lug 38 at the end of the strut 33 to be interlocked thereto by a pintle 39. This hinged connection of the arms 34 and 35 permits them to swing together and the center of each arm is arched to provide an offset 40 in the form of a half circle. The offset 40 of each arm opposes the offset of the other arm so that when the two arms swing together, a tubular bicycle frame H may be held in the offsets as illustrated.

The extended end of each arm includes a hole 41 which lies in registration with the corresponding hole 41 of the mating arm to receive a conventional padlock 42.

The wire rope R is preferably a very tough, standard type which will resist cutting with nippers, one type being termed aircraft cable. One end of this rope extends from the orifice 22 to be wrapped about or interwoven through the bicycle frame and wheels and this end includes a cable eye 50 which is proportioned to be placed upon the clasp arms 34 and be secured by the padlock 42, all as illustrated at FIG. 1. The other end of the wire rope R, within the post, is connected to a moderately heavy cylindrical head 51 which is proportioned to freely slide within the post as illustrated at FIG. 2. This head is preferably a lead weight with the end of the wire secured to the weight, such as extended through it, spread and soldered at the bottom for a secure connection as at 52. The weight of the head 51 will ordinarily pull the wire rope into the post as shown, when not in use. Thus, whenever it is to be used, the wire rope is pulled from the post P so that it may be wrapped around and through portions of a bicycle. Preferably, this wrap-around operation will include threading the wire rope through each bicycle wheel and, also, through the bicycle frame and even about the post itself as illustrated at FIG. 1. This effectively lashes the bicycle in place. When the bicycle is to be lashed to the post in this manner, it is important that the wire rope be long enough for the purpose and as heretofore mentioned, the length of the post, including the portion embedded into the cement or ground surface, must be sufficient as to permit the wire rope R to be pulled into the post for storage when it is not used.

The manner in which this standard is to be used is apparent from the foregoing description. When a bicycle is to be parked and secured to the standard, the body clamp is first raised to the level of the horizontal frame member H of the bicycle and secured to the post by the lock screw 31. The arms 34 and 35 are then folded together upon the bicycle frame member and the wire rope R is pulled from the cap 22 at the top of the post and wrapped around the bicycle frame, through a wheel, thence around the post through the other wheel and to the clamp arms. The padlock 42, which secures the rope eye 50 and the arms 34 and 35, will be owned by the bicycle owner so that no one else may remove the bicycle. The bicycle is held in an upright position while it is being parked and is ready for use as soon as released.

Several variations of the construction hereinabove set forth are possible. The apparatus may be incorporated into a conventional parking meter as shown at FIG. 5. Parking meters are commonly mounted upon upright standards or posts which are ideally suited to serve as the post P in the present invention. The collar 30 of a body clamp B can be fitted upon a parking meter post to hold a bicycle as heretofore described. A wire rope R can be retained within this post below the parking meter and extend from the post through a side outlet 22' as illustrated. Thus, the bicycle can be parked and locked against the post of the parking meter without interfering with the regular use of the parking meter for an automobile. If it becomes desirable, the parking meter can be used in connection with parking of the bicycle where it is required that a coin also be placed in the parking meter for parking the bicycle.

The arrangement shown at FIG. 6 is useful where space is at a premium. A compact body clamp B' is provided where a lug 38' is connected directly to the collar 30' to eliminate the horizontal strut 33 heretofore described. In this arrangement, the collar 30' is fitted upon a post P and the clasp arms 34 and 35 are the same as heretofore described. Also, a rope R extending from the post P will be used to lash the bicycle in place as heretofore described.

We have now described our invention in considerable detail. However, it is obvious that others skilled in the art can build and devise alternate and equivalent constructions which are nevertheless within the spirit and scope of our invention. Hence, we desire that our protection be limited not by the constructions illustrated and described, but only by the proper scope of the appended claims.

We claim:

1. A standard for parking and locking a bicycle with a locking means comprising in combination:
   a a tubular post upstanding from a surface and having a cable-attaching portion on the post;
   b a body clamp means outstanding from the post to engage and clamp upon the tubular frame portion of a bicycle and including a locking hole means therein to receive said locking means, and
   c cable means having one end extending from the cable-attaching portion and being of a length to be interwoven through both wheels of a bicycle held by the body clamp and to terminate at its extended end adjacent to said locking hole means, said cable means including an eye at the extended end of said cable means to receive said locking means when said locking means are inserted through said locking hole in said body clamp means.

2. In the combination defined in claim 1 wherein:
said post is the post of a parking meter with an orifice at a side thereof in communication with the hollow interior of said post, and said cable means being extendable through the orifice.

3. In the combination defined in claim 1 wherein:
the top of the post is closed with the cap and the orifice is in the cap.

4. In the combination defined in claim 1 wherein:
the body clamp includes a pair of opposing hinge clasps adapted to swing against each other and having opposing socket portions to engage a frame and with the hole means comprising a hole at the end of each clasp in registration with the other.

5. In the combination defined in claim 1, wherein the body clamp means includes a collar about the post, an arm outstanding therefrom, a pair of opposing hinged clasps at the outstanding end of the arm adapted to swing together, opposing socket portions in the clasp to engage a bicycle frame, and said hole means including a hole at the outer end of each clasp in registration with the other.

6. In the combination defined in claim 5 including:
a securing means on the collar to lock the collar onto the post at any selected height to match the height of a frame member of a bicycle.

7. In the combination defined in claim 1 wherein:
the cable means comprises a wire cable of tough cutresistant strands.

8. In the combination defined in claim 1 wherein:
the restraining means at the aforesaid other end of the rope comprises a cylindrical weight affixed to the end of the rope means, loosely fitting within the post and being adapted to drop to the base of the post to pull the cable means thereinto when it is not in use.

9. In the combination defined in claim 8 where the length of the wire cable exceeds the height of the post, and wherein:
said post is extended into the ground below the pavement surface a distance sufficient to permit the bulk of the wire cable to be pulled into the post when it is not used.

10. A standard for parking and locking a bicycle with a locking member comprising in combination:
a a tubular post upstanding from a pavement surface and extending to a height above the height of a bicycle frame and having an orifice opening at the top section of this post,
b a body clamp including a collar embracing the post and a lock means adapted to position the collar at any selected height on the post to accommodate the frame of a given bicycle,
c an arm permanently affixed to the collar and extending horizontally therefrom,
d a pair of opposing hinged clasps pivotally carried upon the outstanding end of the arm with each clasp having an opposing socket portion to engage the frame of a bicycle and a hole at its extended end in registration with a corresponding hole on the other clasp to receive a locking member for locking the same upon the bicycle frame, and
e a wire cable of tough, cut-resistant strands carried within the post with one end extending from the post orifice and formed as an eye and the opposite end within the post connected to a cylindrical weight loosely fitting in the post and being adapted to drop to the base of the post to pull the cable thereinto when not in use, said cable being of a length to be pulled from the post, wrapped about a bicycle and with its eye aligned with the holes on said clasps for connection to the clasp by the locking member.

* * * * *